Nov. 2, 1971 J. S. ECKERT Re. 27,217

(PALL) PACKING RING

Original Filed March 5, 1962

INVENTOR.
JOHN S. ECKERT
BY Gordon C. Mark
ATTORNEY

United States Patent Office

Re. 27,217
Reissued Nov. 2, 1971

27,217
[PALL] PACKING RING

John S. Eckert, Silver Lake, Ohio, assignor to The United States Stoneware Company, Tallmadge, Ohio Original No. 3,266,787, dated Aug. 16, 1966, Ser. No. 177,577, Mar. 5, 1962. Application for reissue June 28, 1967, Ser. No. 653,595
Int. Cl. B01f *3/04*
U.S. Cl. 261—94 5 Claims

Matter enclosed in heavy brackets [ ] appears in the original patent but forms no part of this reissue specification; matter printed in italics indicates the additions made by reissue.

*ABSTRACT OF THE DISCLOSURE*

*A packing ring having a peripheral wall defining an open space, a flap cut from the wall and bent inwardly into the open space and a tongue cut from the flap and bent away therefrom but contained within the wall.*

This invention relates to an improved [pall] *packing* ring to be used as packing in a gas-and-liquid contact tower.

The most efficient [pall] *packing* rings *compromise* [comprise] between providing (1) maximum surface for gas-and-liquid contact and maximum drainage points, and (2) minimum interference to the flow of the gas. They must be strong enough to support the load of a bed of [pall] *packing* rings above them.

It is known to strengthen a [pall] *packing* ring by providing circumferential grooves in its wall. However, it has not been appreciated that if a [pall] *packing* ring is rolled from a flat strip, one or more concavo-convex circumferential grooves tend to prevent the sheet metal from unrolling. This is true whether the grooves are concave or convex with respect to the exposed surface of the ring. The grooves need not be continuous, but parts may be staggered; however, some portion of each edge-to-edge section of the [pall] *packing* ring is grooved. The invention includes such grooved rings.

It is known to provide flaps cut from the wall and bent into the interior of the ring. Rings with such flaps are more efficient than rings without such flaps, but there is still a large open area within such a ring through which a gas can pass without contacting the ring. In considering the open area [/] do not refer primarily to the impediments a gas encounters in flowing in the general direction of the axis of the ring, but to impediments encountered by a gas that flows generally upward through a bed of rings in a tower, the rings being positioned at random so that the gas enters the various rings at different angles.

According to this invention, one or more tongues are cut in each flap of a [pall] *packing* ring, and these tongues protrude from one or both sides of the flaps providing additional drainage points for the liquid as well as presenting a surface for contact by the gas where there previously has been an open space. These tongues lie generally in planes perpendicular to a right cross section of the [pall] *packing* ring, but they may be cut at an angle or turned at an angle to provide greater surface contact with a gas passing axially through the ring. Similarly, the flaps from which the tongues are cut may be cut at an angle or turned at an angle to provide more direct surface contact with a gas. One or more edges of the flat of a [pall] *packing* ring and/or one or more edges of the tongues of a [pall] *packing* ring with flaps are serrated to provide an increased number of points for the release of liquid flowing down through the tower. The use of such [pall] *packing* rings in a tower increases its efficiency because it increases the drip points which increases the area of the liquid exposed to the gas and the area of the liquid exposed to the gas within a tower is an important factor in determining the extent of the interchange between the gas and the liquid within the tower.

The invention will be further described in connection with the accompanying drawing, in which.

The ring includes flaps 5 cut from the cylindrical wall 6 and a tongue 7 cut from each flap. The flaps and tongues are joined to the wall along lines 10 and 11, respectively, which are perpendicular to the ends of the wall.

Figure 3:
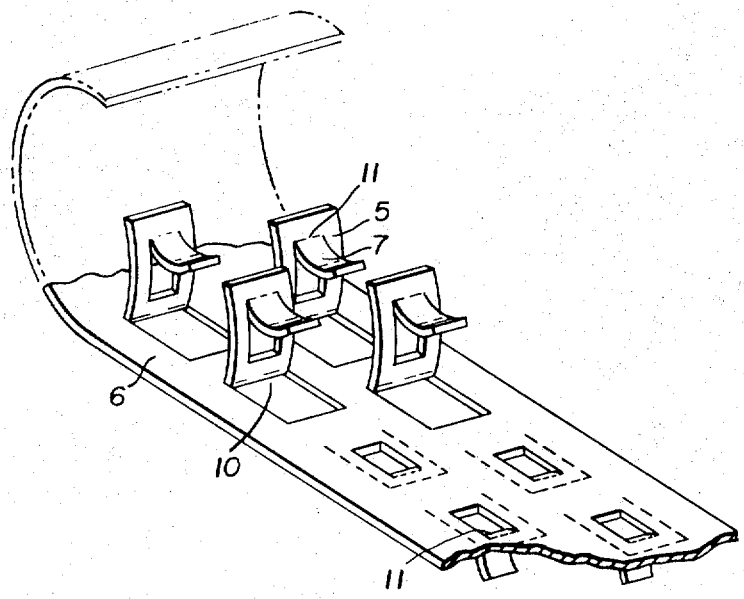
FIG. 3 is a view in perspective of a strip of metal showing more or less schematically preferred steps in the manufacture of a [pall] *packing* ring.

FIG. 3 illustrates the preferred method of manufacturing the rings from a strip of any suitable metal. The strip is long enough to form any rings. First the tongues 7 are cut and bent away from the wall, then the flaps 5 are cut and bent away from the tongue, and then the ring is bent and the strip is cut into lengths, separating the various rings. The flaps are bent to the interior of the rings, and, in the drawing, each tongue is bent to the side of its flap which is away from the wall of the ring.

Figure 1:
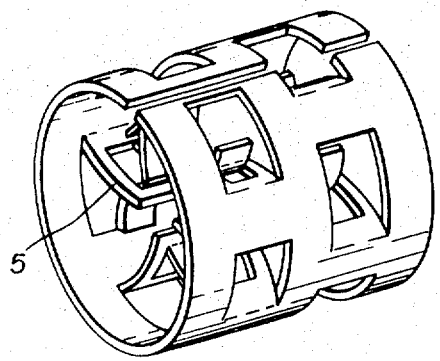
FIG. 1 is a view in perspective of a [pall] *packing* ring provided with tongues in the flaps.
Figure 2:
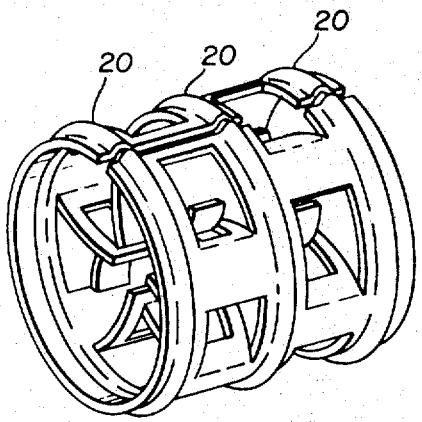
FIG. 2 is a view in perspective of a grooved [pall] *packing* ring of modified form.

FIG. 2 is identical, except for the concavo-convex circumferential grooves 20 which reduce or eliminate the tendency of the ring, if of metal, from unrolling. Instead of making the grooves convex with respect to the exposed wall of the ring, they may be concave. They increase the effective thickness of the wall and this reduces or prevents the tendency of the ring to unroll. This is true whether or not the ring includes tongues, and whether or not it includes flaps.

Figure 4:
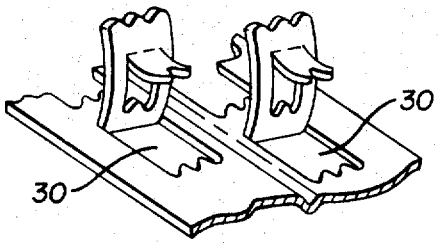
FIG. 4 is a portion of a grooved [pall] *packing* ring with flaps and tongues with serrated edges.

FIG. 4 illustrates a [pall] *packing* ring with both tongues and flaps with serrated edges. Although the purpose of the serrations is to increase the drip points, and therefore only the bottom edges need be serrated, it is impossible to predetermine which edge or edges will be at the bottom in a random loading of a tower, so preferably all edges are serrated. The strength of the ring depends upon the width of the areas 30 from which the flaps are cut. Only certain edges may be serrated or all edges may be serrated.

The word "serrated" is used herein in its broad sense to include scalloped edges, pointed edges, etc.

The number of flaps in a ring may vary, but generally there are three to eight such flaps. These flaps are generally curved somewhat as shown, but may be flat or other desired shape.

Although the rings are usually made from metal, they may be made from plastic.

The invention is covered in the claims which follow.

What I claim is:

1. A metal [pall] *packing* ring with a flap cut from the wall thereof and bent inward and at least one tongue cut from the flap and bent away from the flap but contained within the wall of the ring, the edges of the [flaps and tongues] *said flap and said at least one tongue* being serrated, and at least one circumferential concavo-convex groove in the wall of the ring, the ring being slit from one edge to the other.

2. A [pall] *packing* ring with a flap cut from the wall thereof and bent inward and at least one tongue cut from the flap and bent away from the flap but contained within the wall of the ring.

3. A [pall] *packing* ring with a flap cut from the wall thereof and bent inward, with the line of its joinder to he wall parallel to the axis of the ring, and a tongue ut from the flap and bent away therefrom on the side hereof opposite that of the wall from which the flap is ut, with the line of joinder of the tongue to the flap arallel to the axis of the ring.

4. A [pall] *packing* ring with inwardly directed flaps n the wall thereof, and a tongue directed away from each lap, at least one edge of each tongue being serrated.

*5. A packing ring having a periphery defined by a wall urrounding an open space, at least one cut portion of aid wall bent inwardly of said periphery, defining a first urface where previously there had been open space, nd at least one tongue formed from said cut portion of vall, bent to provide a second surface within the periphery f said packing ring, angularly displaced from said first urface, where previously there had been open space.*

References Cited

The following references, cited by the Examiner, are f record in the patented file of this patent or the original atent.

UNITED STATES PATENTS

| | | | |
|---|---|---|---|
| 2,602,651 | 7/1952 | Cannon | 261—95 |
| 3,013,781 | 12/1961 | Haselden | 202—158 X |
| 3,151,187 | 9/1964 | Comte | 261—98 X |
| 1,503,208 | 7/1924 | Prym | 261—95 |
| 1,610,383 | 12/1926 | Johnson | 29—534 |
| 2,639,909 | 5/1953 | Leva | 261—95 |
| 2,702,429 | 2/1955 | Peters et al. | 29—534 |
| 2,867,425 | 1/1959 | Teller | 261—95 |

FOREIGN PATENTS

| | | | |
|---|---|---|---|
| 542,902 | 5/1922 | France | 261—94 |
| 1,130,730 | 10/1956 | France | 261—94 |
| 853,159 | 10/1952 | Germany. | |
| 139,880 | 3/1920 | Great Britain | 261—95 |

OTHER REFERENCES

U.S. Stoneware Bulletin, TP 54, The U.S. Stoneware Company, Akron 9, Ohio, copyright 1957, p. 11 relied on.

FRANK W. LUTTER, Primary Examiner